United States Patent [19]

Shimokoriyama et al.

[11] Patent Number: 4,875,090

[45] Date of Patent: Oct. 17, 1989

[54] INFORMATION DATA TRANSMISSION SYSTEM

[75] Inventors: Makoto Shimokoriyama; Shinichi Yamashita; Naoto Abe, all of Kanagawa; Motokazu Kashida, Tokyo; Masahiro Takei; Koji Takahashi, both of Kanagawa, all of Japan

[73] Assignee: Canon Kabushiki Kaisha, Tokyo, Japan

[21] Appl. No.: 3,941

[22] Filed: Jan. 16, 1987

[30] Foreign Application Priority Data

Jan. 27, 1986 [JP] Japan .................................. 61-016387

[51] Int. Cl.⁴ ............................................. H04N 11/06
[52] U.S. Cl. ...................................... 358/12; 358/138; 358/141
[58] Field of Search ...................... 358/12, 14, 13, 133, 358/135, 140, 141, 142

[56] References Cited

U.S. PATENT DOCUMENTS 3,403,226  9/1968  Wintringham ...................... 358/135
4,628,344 12/1986  Glenn ..................................... 358/12
4,719,642  1/1988  Lucas ................................... 358/135

FOREIGN PATENT DOCUMENTS 126375  5/1984  European Pat. Off. .
3248687  7/1984  Fed. Rep. of Germany .
00181  1/1981  PCT Int'l Appl. .

*Primary Examiner*—Tommy P. Chin
*Attorney, Agent, or Firm*—Robin, Blecker, Daley & Driscoll

[57] ABSTRACT

An information data transmission system deals with a plurality of kinds of information data different in quantity from one another and respectively corresponding to prescribed amounts of an information signal. The system has first encoding circuitry for encoding the plurality of kinds of information data and second encoding circuitry for predictively encoding the plurality of kinds of information data. The timing of the production of outputs from the first and second encoding circuits is such that, for all kinds of the plurality of information data, the quantity of information data encoded by the first encoding circuitry is equalized.

14 Claims, 5 Drawing Sheets

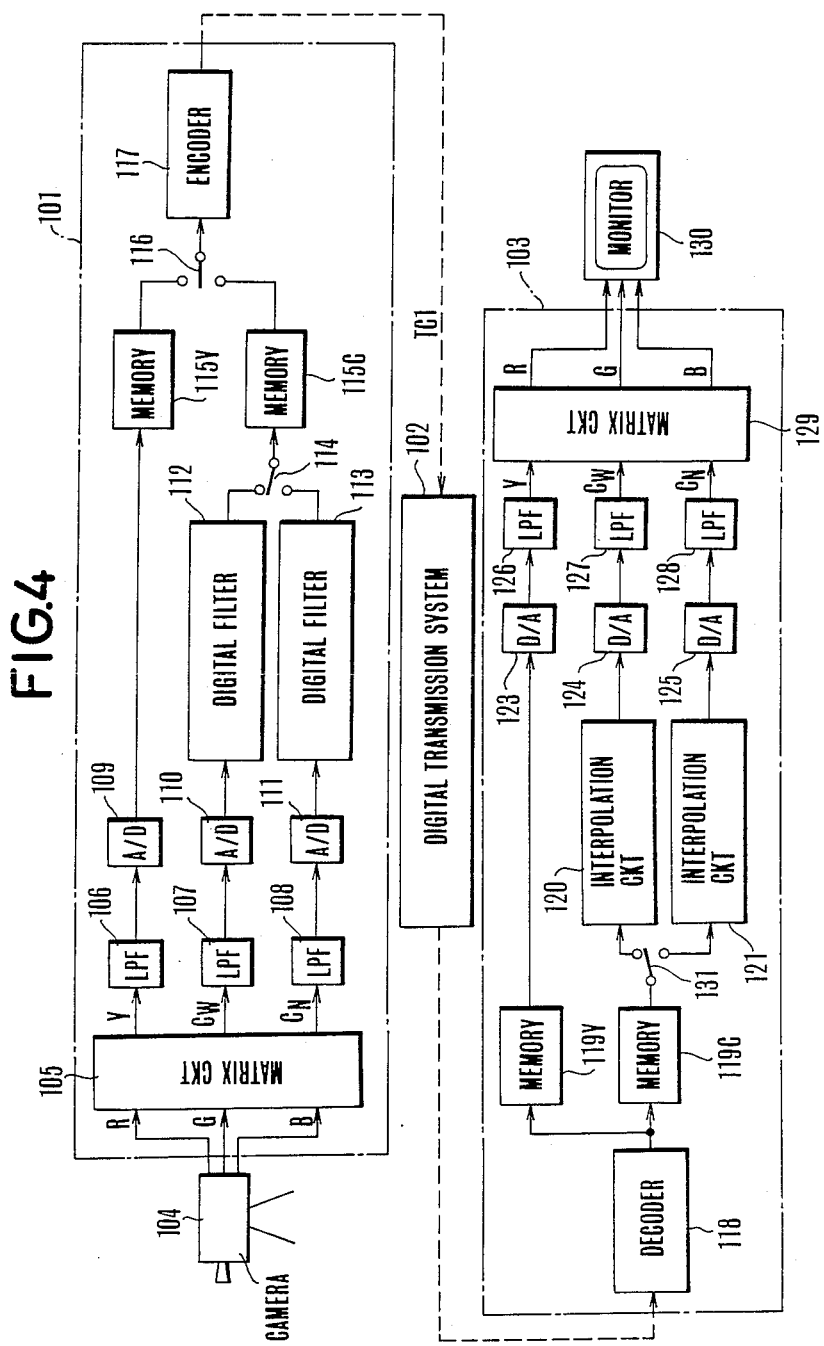

INFORMATION DATA TRANSMISSION SYSTEM

BACKGROUND OF THE INVENTION

1. Field of the Invention

This invention relates to information data transmission systems, and more particularly to information data transmission systems in which the series of information data are transmitted in predictively encoded form. 2. Description of the Related Art In the art of analog transmissions such as in FM broadcasts by the communications satellite or on the ground surface, consideration of the transmission method has so far been limited to what is called "time compressed integration" (TCI). This comprises separation of the television signal into the luminance and chrominance signals, which are then time-axially compressed to be transmitted in the time-divisional multiplex form.

An example of the signal according to the TCI system or the TCI signal is shown in FIG. 1 where a color signal $C_W$ of the wide band axis in the color spatial frequency characteristic of visual angle appears for a time 1, another color signal $C_N$ of the narrow band axis perpendicular thereto in the uniform-chromaticity-scale (UCS) diagram as is well known in the art, occurs for a time 2, and the luminance signal Y takes place for a time 3. It is here assumed that the number of effective samples of each of the color signals $C_W$ and $C_N$ in one horizontal scanning period is ¼ of that of the luminance signal Y, for the $C_W$ and $C_N$ both are time-axially compressed to 1/5, and the Y to 4/5. One of the $C_W$ and $C_N$ and the Y constitute a television signal for one horizontal period. As for the color information, the $C_W$ and $C_N$ are transmitted line-sequentially.

We now consider that such a TCI signal is to be transmitted in the form of digital data. In general, the digital transmission system uses the technique of reducing the quantity of data to be transmitted in such a way as to compress the band of transmission of the data to achieve an advantage that, for example, the transmission efficiency in the transmission path such as circuits is increased to transmit the signals economically. Particularly for transmission of video signals, as the technique of this sort, use is often made of being predictively encoded by utilizing the correlation of informations.

An example of it is the so-called the differential pulse code modulation (DPCM), which enables a picture of higher resolution to be transmitted with a reduced quantity of data. But there is a problem that if an error occurred in the DPC-modulated data to be transmitted, as to when to demodulate them, this error is allowed to propagate. Although it is usual in the digital transmission system that the error is corrected or compensated for by addition of an error correction code or error detection code, there exists occurrences of oversight to correction with a certain probability. From this reason, once an error has occurred in the data to be transmitted, the image is caused to deteriorate largely.

The general counter-measure against the propagation of such an error has been that for every prescribed number of data, the DPCM is not carried out and instead the data to be transmitted are merely pulse code (PC)-modulated. FIG. 2 shows an example of a data series after the application of such a kind of counter-measure against propagation of the error. All the sections shown in FIG.2 constitute a corresponding signal to one horizontal scanning period of the above-described TCI signal. In the drawing, the hatched portions represent the PCM data, and the other portions of white blank represent the DPCM data.

The DPCM encoder for producing the data series such as that shown in FIG. 2 is exemplified in FIG. 3 where the TCI signal after PCM enters at a terminal 11. The encoder includes a subtractor 12, a non-linear quantizing circuit 13, a representative value setting circuit 14, a delay circuit 15, and an adder 16. In operating the encoder, data which will later be demodulated by a demodulating system or decoder (not shown) is produced from the delay circuit 15 in delay by one data transmission period. This local data to be demodulated is applied to the subtractor 12 in which that data to be demodulated which is related to the DPCM data that just precedes the presently inputted DPCM data is subtracted from the latter to obtain a difference data. This difference data is then non-linearly quantized by the circuit 13 to obtain a data of which the number of bits is fewer than that of the difference data as the input. By using this data as the DPCM data to be transmitted, it is made possible to reduce the quantity of data to be transmitted. And the aforesaid DPCM data when in the representative value setting circuit 14 is made to change its number of bits to the original one so that it becomes the data of respresentative value in each quantizing step and is to be used for the local demodulation.

For every one datum inputted to the terminal 11, a pulse enters another terminal 17. Each time a counter 20 has counted N pulses, it once moves a switch 18 to a position B. Thereby, one out of N data to be transmitted is made the PCM datum.

In such a manner, the propagation of the error is stopped at a time when the PCM datum is transmitted after the prescribed number of DPCM data with inclusion of that error have been transmitted. In the following, the datum that comes to stop the propagation of the error will be called the "reset" datum.

When the TCI signal is transmitted by using that series of data which is of the form shown in FIG.2, however, the deterioration of the color signals becomes appreciable. This is because the length of propagation of the error in the reproduced picture when it occurred in those of the DPCM data which are comprised of the color signals is longer than when in the DPCM data of the luminance signal. With a view of the background that, from the very beginning, the color information is coarser than the luminance information, the deterioration of the image quality due to the propagation of the error becomes rapidly larger. Therefore, the reproduced picture gives a very unpleasant impression. Another problem is that the use of the line-sequential method for transmitting the $C_W$ and $C_N$ as shown in FIG. 1 leads to a possibility that when one of the data of the $C_W$ or $C_N$ errs, the color informations for at most two horizontal scanning periods cannot be recovered.

SUMMARY OF THE INVENTION

An object of the present invention is to provide an information data transmission system which enables the above-described problems to be eliminated.

Another object is to provide a picture information data transmission system for transmitting picture information data including the corresponding luminance and color information data to a prescribed amount of picture information signal in which when it happens that the data errs, the error of the data is prohibited from propagating so that the deterioration of the signal due to the error of the aforesaid picture information data does not become appreciable.

Under such an object, according to the present invention, in one embodiment thereof, the picture information data transmission system for transmitting picture information data including the corresponding luminance and color information data to a prescribed amount of picture information signal is provided with first encoding means receptive of the aforesaid luminance and color information data for producing outputs representative of their codes; second encoding means receptive of the aforesaid luminance and color information data for producing outputs representative of predictive codes; and means for controlling the timing of production of the outputs of the first and second encoding means in such a way that for each of the corresponding luminance and color information data to the aforesaid prescribed amount of picture information signal, the quantity of encoded information data by the first encoding means is equalized.

Still another object is to provide a picture information data transmission system for picture information data having luminance and color information data in which when a data error occurs, propagation of the data error can be prohibited in every prescribed number of samples of each of the luminance and color information data.

Under such an object, according to the present invention, in one embodiment thereof, the picture information data transmission system for those picture information data which include luminance and color information data is provided with first encoding means receptive of the aforesaid luminance and color information data in each sample for producing an output representative of codes for each sample; second encoding means receptive of the aforesaid luminance and color information data in each sample for producing an output representative of predictive codes for each sample; and means for controlling the timing of production of the outputs of the first and second encoding means in such a way that one out of n samples (where n is a positive integer) of the aforesaid luminance information data and one out of m samples (where m is a positive integer) of the aforesaid color information data are encoded by the first encoding means.

A further object is to provide for the picture information data transmission system with means of simple structure making it possible to transmit picture information data including luminance and color information data in such a form that even when a data error occurs, it can be corrected easily.

Under such an object, according to the present invention, in one embodiment thereof, the picture information data transmission system for those picture information data which include luminance and color information data is provided with first encoding means receptive of the aforesaid luminance and color information data in each sample for producing an output representative of their codes for each sample; first memory means for storing k samples (where k is a positive integer) of the encoded luminance information data by the first encoding means; second memory means for storing l samples (where l is a positive integer) of the encoded color information data by the first encoding means; second encoding means for predictively encoding the outputs of the first and second memory means each in each sample; and means for controlling the first memory means, the second memory means and the second encoding means in such a manner that as m samples (where m is a positive integer equal to or smaller than k) of color information data and n samples (where n is a positive integer equal to or smaller than l) of luminance information data are alternatively read out from the second and first memory means respectively, one out of the m samples of color information data and one out of the n samples of luminance information data are placed onto its output lines without being predictively encoded by the second encoding means.

A further object is to provide an information data transmission system in which a plurality of kinds of information data each corresponding to a prescribed amount of information signal are predictively encoded before they are transmitted, when an error occurs in the data, the erroneous datum can be prohibited from propagating so that the aforesaid information signal is not deteriorated.

Under such an object, according to the present invention, in one embodiment thereof, the information data transmission system for a plurality of kinds of information data different in quantity from one another and each corresponding to a prescribed amount of information signal is provided with predictively encoding means receptive of the aforesaid plurality of kinds of information data for transmitting them in predictively encoded form; and means for resetting the encoding means in different timing depending on the kind of the information data.

These and other objects and features of the invention will become apparent from the following detailed description of embodiments thereof by reference to the accompanying drawings.

BRIEF DESCRIPTION OF THE DRAWINGS

FIG. 4 is an electrical circuit diagram of an embodiment of the information data transmission system according to the present invention.

DETAILED DESCRIPTION OF THE PREFERRED EMBODIMENTS

The present invention is next described in connection with embodiments thereof.

Figure 5A:
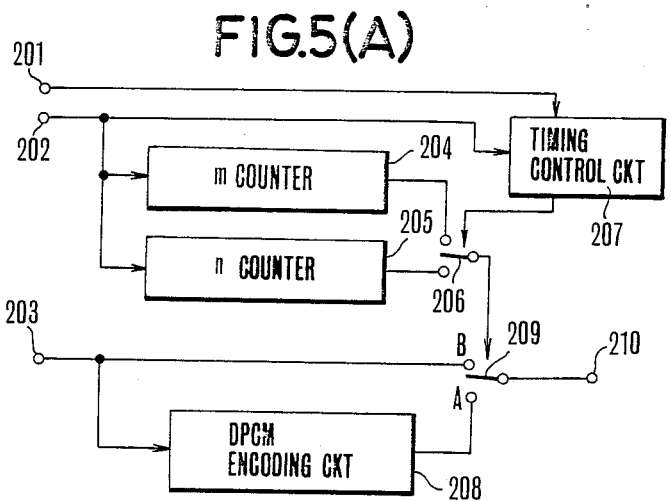
FIGS. 5(A) and 5(B) are electrical circuit diagrams of two examples of the encoder constituting the essential part of the information data transmission system of the invention.
Figure 5B:
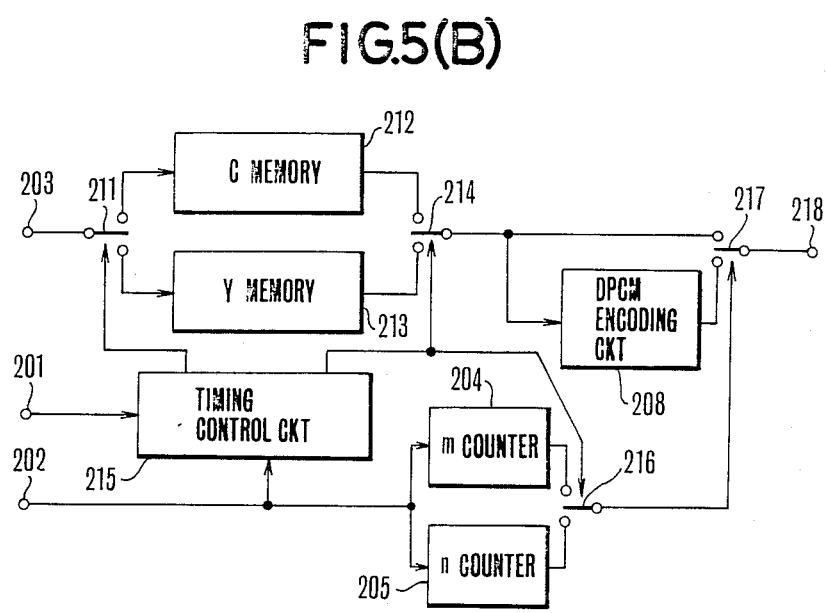
Figure 6:
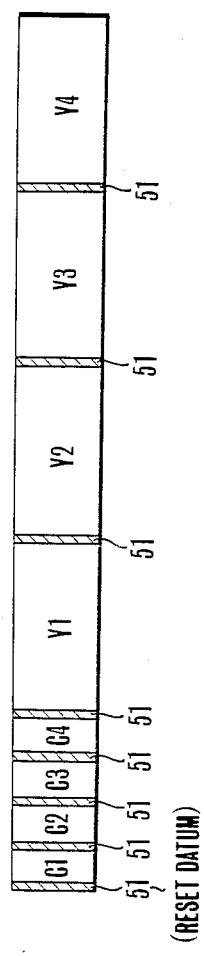
FIGS. 6 and 7 are schematic diagrams of the series of data obtained from the encoders of FIGS. 5(A) and 5(B) respectively.
Figure 7:
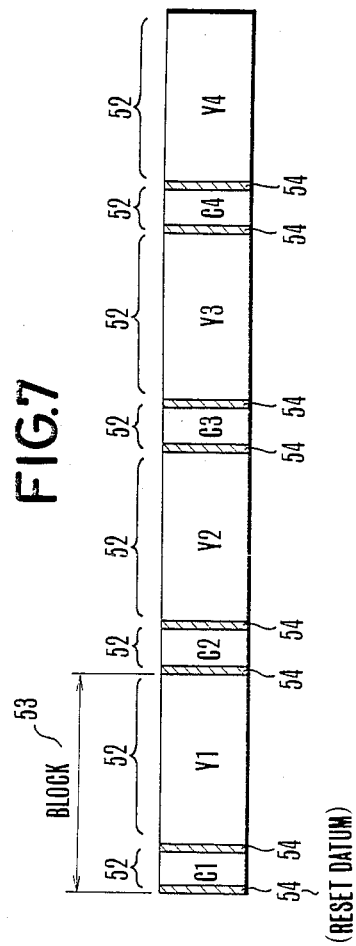

FIG. 4 shows the outline of the construction of one embodiment of a TCI signal transmission system as a whole according to the present invention. The details of two different examples of the encoder of FIG. 4 are shown in FIGS. 5(A) and 5(B). The data series obtained from the encoders of FIGS. 5(A) and 5(B) are shown in FIGS. 6 and 7 respectively.

The system of FIG. 4 comprises an encoder within a dot-and-dash line block 101, a digital transmission system 102 such as digital VTR and a decoder within another dot-and-dash line block 103.

A television camera 104 produces three primary color signals R, G and B which are applied to a matrix circuit 105 known to those skilled in the art where Y, $C_W$ and $C_N$ are formed. After their bands are limited by respective low pass filters (LPFs) 106, 107 and 108 they enter respective analog-to-digital (A/D) converters 109, 110 and 111 and are sampled therein at respective prescribed frequencies.

Figure 1:
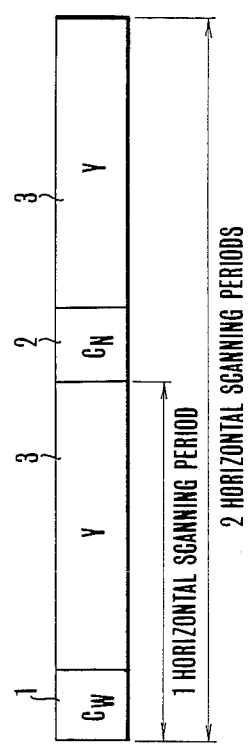
FIG. 1 is a schematic diagram of an example of the TCI signal.
Figure 2:
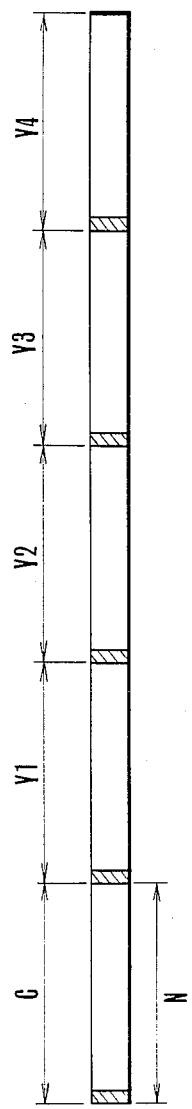
FIG. 2 is a schematic diagram of an example of the series of data obtained from the conventional system.

The outputs of the A/D converters 110 and 111 representing the data of $C_W$ and $C_N$ then pass through digital filters 112 and 113 to limit the bands in the vertical and horizontal directions of the picture and then are thinned out by a switch 114 to a sampling rate equal to ¼ of the sampling rate of the A/D converter 109. Thus a line-sequential signal is obtained. In memories 115Y and 115C, the data from their input lines are read out with the time axes compressed to 4/5 and 1/5 respectively. Based on this readout timing of the memories 115Y and 115C, a switch 116 is changed over so that a sequence of data according to the TCI system shown in FIG. 1 (TCI data) appear at the output of the switch 116 with a constant frequency. The TCI data are then supplied to a encoder 117 and after having been subjected to the treatment to be described later, placed on its output line to the transmission system 102.

The decoding circuit in the block 103 includes a decoder 118 in correspondence to the encoder 117, memories 119Y and 119C having time-axis expanding rates of 5/4 and 5/1 respectively, interpolation circuits 120 and 121 for the horizontal and vertical directions respectively, digital-to-analog (D/A) converters 123, 124 and 125, LPFs 126, 127 and 128 for producing the Y, $C_W$ and $C_N$ in analog form, and a matrix circuit 129 for producing the three primary color signals R, G and B. In short, the decoder 103 performs the reverse treatment to that of the encoder 101, giving the three primary color signals to a monitor 130.

Next, we explain about the encoder shown in FIG. 5 in detail. In FIG. 5(A), pulses with an equal frequency to the horizontal scanning frequency enter at a terminal 201. Timing pulses of the same period as that of the data produced from the switch 116 enter at another terminal 202. The data or output line of the switch 116 is connected to another terminal 203.

Figure 3:
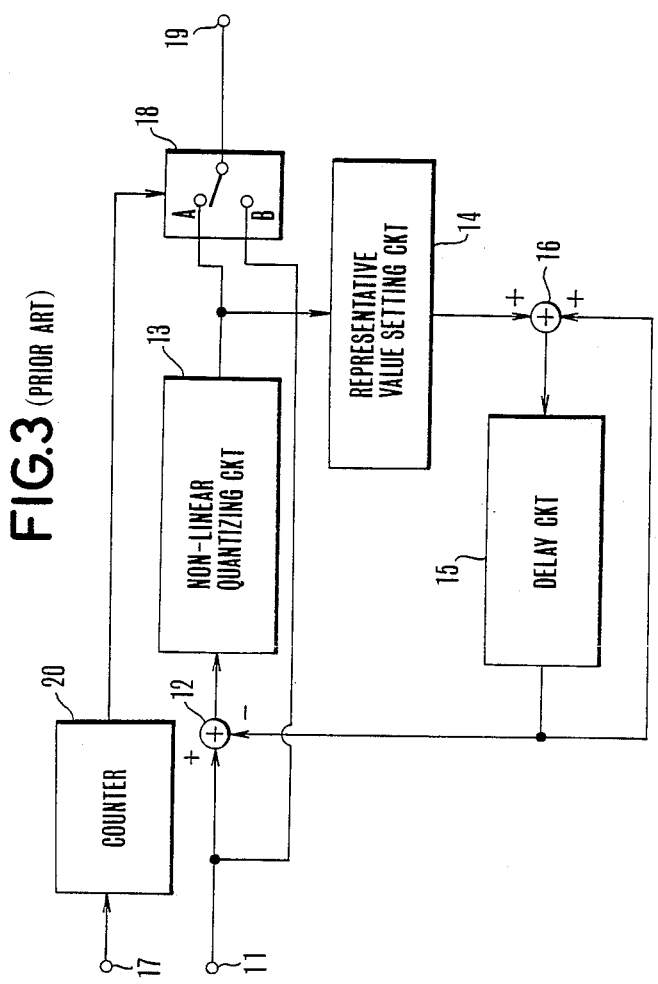
FIG. 3 is an electrical circuit diagram of an example of the DPCM encoder for producing the data series shown in FIG. 2.

The PCM data entering this encoder are routed to a DPCM encoding circuit 208 such as that shown in FIG. 3, from which the DPCM data are obtained. The PCM and DPCM data are selectively placed onto an output terminal 210 by a switch 209. This switch 209 is reset in every m data for the $C_W$ or $C_N$ or every n data for the Y by the output of a switch 206. It is to be noted here that the number of data of the Y in one horizontal scanning period is 4 times that of data of the $C_W$ or $C_N$. The value of n is 4 times as large as the value of m. Each time the m-th or n-th datum arrives at the terminal 203, counters 204 and 205 produce outputs of high level respectively. One of these outputs is selected by a switch 206 for application to control the switch 209 depending on the output of a timing control circuit 207.

A series of data produced from the coder of FIG. 5(A) is shown in FIG. 6. The illustrated section of this data series corresponds to that part of the TCI signal which occurs during one horizontal scanning period. It should be recognized that the reset datum 51 in the form of the PCM datum is set four in number not only to the Y but also to the C when they are transmitted.

The introduction of the above-described feature makes it possible to eliminate the problem that the fault of propagation of the erroneous DPCM data concentrates on only the deterioration of colors. To add an error correction code to such a data series to be transmitted, however, because that part of the data which relates to the color signal does not match that part of the data which relates to the luminance signal in quantity, there is need to use two error correction coding circuits of different structure.

Another example of the encoder which is considered a most preferable embodiment of the invention is shown in FIG.5(B), since it has achieved the possibility that only one error correction encoding circuit is sufficient. In FIG. 5(B), the similar constituent parts to those shown in FIG.5(A) are denoted by the same reference numerals and their explanation is omitted.

C and Y memories 212 and 213 are provided for changing the timing of transmission of the $C_W$ or $C_N$ and Y respectively, and each have a capacity of storing the C or Y data for, for example, ¼ of the horizontal scanning line. The timing control circuit 215 uses both pulses of the transmission period of each datum and of the horizontal scanning period to control the change-over timing of switches 211 and 214 and the write-in and readout timing of the C and Y memories 212 and 213 in such a manner that the chrominance and luminance data of ¼ of the horizontal scanning line alternatively appear at the output of a switch 214.

Further, another switch 217 is controlled in such a manner that each time the chrominance or luminance data of ¼ of the horizontal scanning line have been produced, the PCM datum 54 as the reset datum is produced at its output. A series of data obtained from the encoder of FIG. 5(B) is shown in FIG. 7, where the divided parts of the DPCM data in unity of ¼ of the horizontal scanning line are indicated at 52 with the PCM datum 54 between successive two of the divided parts 52. If the data series is of the form shown in FIG. 7, the chrominance and luminance data for ¼ of the horizontal scanning line can be taken as one block indicated at 53. So, the number of error correction encoding circuits can be reduced to only one.

Though, in the above-described embodiments, as the predictive encoding method use has been made of DPCM, it is to be understood that the present invention is not confined thereto. It can be applicable to another types of systems in which the predictive encoding is performed in the so-called "2-dimension" or "3-dimension" mode. Even in these cases, similar advantages to those described above can be produced when the rate of the reset datum that is not predicitively encoded is changed over between two different values for the chrominance and luminance data.

According to the embodiments of the invention as has been described above, a data transmission system which does not allow only the deterioration of the color signal to appreciably intensify, and enables the propagation of the error to be prohibited with high efficiency, can be obtained.

What is claimed is:

1. An image information signal transmission system for transmitting an image information signal including at least a luminance information signal and a chrominance information signal, comprising:
    (A) conversion means for receiving said luminance information signal and said chrominance information signal and for converting these signals to respective digital signals, thereby producing respective digital luminance information data and digital chrominance information data corresponding to said luminance information signal and said chrominance information signal;

(B) predictive encoding means for receiving said digital luminance information data and said digital chrominance information data and for predictively encoding both said data to produce respective predictively encoded digital luminance information data corresponding to said digital luminance information data and predictively encoded digital chrominance information data corresponding to said digital chrominance information data; and (C) data output means for receiving said digital luminance information data and said digital chrominance information data produced by said conversion means and said predictively encoded digital luminance information data and said predictively encoded digital chrominance information data and, with regard to at least said digital luminance information data and said digital chrominance information data, for producing outputs of the digital luminance information data and the digital chrominance information data in such a manner that the amount of the digital luminance information data output corresponding to a predetermined amount of said luminance information signal received by said conversion means is equal to the amount of the digital chrominance information data output corresponding to a predetermined amount of the chrominance information signal received by said conversion means.

2. A system according to claim 1, wherein said image information signal includes such luminance information signal and such chrominance information signal subjected to time-sharing multiplexing in one scanning base.

3. A system according to claim 2, wherein said luminance information signal includes a time-base compressed luminance signal which is produced by compressing a luminance signal in time-base at a predetermined compression rate, and said chrominance information signal includes a time-base compressed chrominance signal which is produced by time-base compression at a predetermined compression rate.

4. A system according to claim 1, wherein said data output means is adapted to produce said outputs of said digital luminance information data and said digital chrominance information data corresponding to a part of said luminance information signal and said chrominance information signal received by said conversion means, respectively and outputs of said predictively encoded digital luminance information data and predictively encoded digital chrominance information data corresponding to other part of the said signal, respectively.

5. An image information signal transmission system for transmitting an image information signal including at least a luminance information signal and a chrominance information signal, comprising:

(A) conversion means for receiving said luminance information signal and said chrominance information signal, for sampling these signals and for converting the sampled signal into respective digital signals, for sequentially forming and outputting a digital luminance information data corresponding to said luminance information signal of one sampling and a digital chrominance information data corresponding to said luminance information signal of one sampling;

(B) predictive encoding means for receiving said digital luminance information data and said digital chrominance information data and for predictively encoding these data and for producing respective predictively encoded digital luminance information data corresponding to said digital luminance information data and predictively encoded digital chrominance information data; and (C) data output means for receiving said digital luminance information data and said digital chrominance information data produced by said conversion means, said predictively encoded digital luminance information data and said predictively encoded digital chrominance information data and for producing outputs of the digital luminance information data composed of per n samples of the digital luminance information data produced by said conversion means and the digital chrominance information data of one sample per m samples produced by said conversion means.

6. A system according to claim 5, wherein said image information signal includes a time-sharing multiplexed image signal in which the luminance information signal and the chrominance information signal are subjected to time-sharing multiplexing in one scanning base.

7. A system according to claim 6, wherein said luminance information signal includes a time-base compressed luminance signal in which a luminance signal is compressed in time-base at a predetermined compression rate and said chrominance information signal includes a time-base compressed chrominance signal which is compressed at a compression rate which is different from said predetermined compression rate.

8. A system according to claim 5, wherein said data output means includes:

(A) a first count circuit arranged to count the number of the digital luminance information data or the digital chrominance information data sequentially outputted from said conversion means and to produce a first detecting signal at every n counts of said first count circuit;

(B) a second count circuit arranged to count the number of the digital luminance information data or the digital chrominance information data sequentially outputted from said conversion means and to produce a second detecting signal at every m counts of said second count circuit;

(C) a detecting signal output circuit arranged to receive said first detecting signal outputted from said first count circuit and said second detecting signal outputted from said second count circuit, to count number of the digital luminance information data or the digital chrominance information data sequentially outputted from said conversion means and to output said first detecting signal or said second detecting signal, depending upon a value of counts; and (D) a data output circuit arranged to receive said digital luminance information data and said digital chrominance information data outputted from said conversion means and said predictively encoded digital luminance information data and said predictively encoded digital chrominance information data outputted from said predictive encoding means and arranged to output said digital luminance information data or said digital chrominance information data, during a period determined depending on the output of said first detecting signal or said second detecting signal from said detecting signal output circuit, and said predictively encoded digital luminance information data or said predictively encoded digital chrominance information data during a period other than the above-mentioned period.

9. An image information signal transmission system for transmitting an image information signal including at least a luminance information signal and a chrominance information signal, comprising:
(A) conversion means arranged to receive said luminance information signal and said chrominance information signal, sample both said signals, respectively and convert the sampled signals into digital signals, to sequentially form and output the digital luminance information data corresponding to said luminance information signal of one sampling and the digital chrominance information data corresponding to said luminance information signal of one sampling;
(B) first memory means for storing k of said digital chrominance information data (k is a positive integer) outputted from said conversion means;
(C) second memory means for storing l of said digital chrominance information data (l is a positive integer);
(D) memory control means for storing said digital luminance information data and said digital chrominance information data and arranged to control write and read of said digital luminance information data to and from said first memory means and to control write and read of said digital chrominance information data to and from said second memory means;
(E) predictive encoding means arranged to sequentially receive the digital luminance information data outputted from said first memory means or the digital chrominance information data outputted from said second memory means, and predictively encode both said data, respectively, to produce predictively encoded digital luminance information data corresponding to said digital luminance information data and predictively encoded digital chrominance information data corresponding to said digital chrominance information data; and
(E) data output means arranged to output one digital luminance information data, as it is among m of said digital luminance information data (m is a positive integer, m≦k) during a period when said memory control means is operating to read said digital luminance information data from said first memory means and to output one of said digital chrominance information data, as it is, among n of said digital chrominance information data (n is a positive integer, n≦l, n=m) during a period when said memory control means is operating to read said digital chrominance information data from said second memory means.

10. A system according to claim 9, wherein said image information signal includes the luminance information signal and the chrominance information signal which are subjected to time-sharing multiplexing in one scanning base.

11. A system according to claim 10, wherein said luminance information signal includes a time-base compressed luminance signal which is produced by compressing a luminance signal in time-base at a predetermined compression rate, and said chrominance information signal includes a time-base compressed chrominance signal which is produced by time-base compression at a predetermined compression rate.

12. A system according to claim 9, wherein said data output means includes:
(A) a first count circuit arranged to count the number of data of the digital luminance information data sequentially read from said first memory means and the digital chrominance information data sequentially read from said second memory means and to produce a first detecting signal at every m counts of said first count circuit;
(B) a second count circuit arranged to count the number of data of the digital luminance information data sequentially read from said first memory means and the digital chrominance information data sequentially read from said second memory means and to produce a second detecting signal at every n counts of said second count circuit;
(C) a detecting signal output circuit arranged to receive said first detecting signal outputted from said first count circuit and said second detecting signal outputted from said second count circuit, and arranged to output said first detecting signal or said second detecting signal, depending upon whether the digital luminance information data is being read from said first memory means or the chrominance information signal is being read from said second memory means;
(D) a data output circuit arranged to receive said digital luminance information data from said first memory means and said digital chrominance information data read from said second memory means and said predictively encoded digital luminance information data and said predictively encoded digital chrominance information data outputted from said predictive encoding means and to output said digital luminance information data or said digital chrominance information data, during a period determined depending on the output of said first detecting signal output circuit, and said predictively encoded digital luminance information data or said predictively encoded chrominance information data during a period other than the above-mentioned period.

13. An information signal transmission system for transmitting a plurality of kinds of information signals, comprising:
(A) analog-digital conversion means arranged to receive said plurality of kinds of information signals and to convert these signals to digital signals, respectively to form and output a plurality of kinds of digital information data corresponding to said plurality of kinds of information signals;
(B) difference encoding means arranged to receive said plurality of kinds of information data outputted from said analog-digital conversion means to effect difference-coding of said information data to form and output difference-encoded data; and
(C) data output means arranged to sequentially output said difference-encoded data sequentially formed by said difference-encoding means and to output a plurality of reset data corresponding in number to the number of said plurality of kinds of information signals received by said analog-digital conversion means, respectively.

14. A system according to claim 13, wherein said data output means is arranged to sequentially output said difference-encoded data sequentially formed by said difference-encoding means and to output equal numbers of the received plurality of kinds of information data as reset data.

* * * * *

UNITED STATES PATENT AND TRADEMARK OFFICE
CERTIFICATE OF CORRECTION

PATENT NO. : 4,875,090

DATED : October 17, 1989

INVENTOR(S) : Makoto Shimokoriyama, et al

It is certified that error appears in the above-identified patent and that said Letters Patent is hereby corrected as shown below:

Col. 5, line 25, change "a" to -- an --
Col. 6, line 47, change "another" to --other--
Col. 8, line 10, after "data" insert -- corresponding to said digital chrominance information data --
Col. 8, line 19, after "data" insert -- (where $n$ is a positive integer) --
Col. 8, line 21, after "samples" insert -- (where $m$ is a positive integer not equal to $n$) --
Col. 9, line 25, change "1" to --$\ell$--
Col. 9, line 26, change "1" to --$\ell$--
Col. 9, line 55, change "1" to --$\ell$--.

Signed and Sealed this

Twenty-fifth Day of September, 1990

Attest:

HARRY F. MANBECK, JR.

*Attesting Officer*      *Commissioner of Patents and Trademarks*